United States Patent [19]
Peterson

[11] 3,710,238
[45] Jan. 9, 1973

[54] SENSITIVE SOUND FAULT METER AND DETECTOR UTILIZING A DOUBLE SIDE BAND FREQUENCY CURRENT-GENERATOR

[75] Inventor: Wesley G. Peterson, Mount Prospect, Ill.

[73] Assignee: Sola Basic Industries, Inc., Milwaukee, Wis.

[22] Filed: April 27, 1971

[21] Appl. No.: 137,814

[52] U.S. Cl. .................... 324/51, 317/18 D, 340/255
[51] Int. Cl. ........................................... G01r 31/02
[58] Field of Search ............. 324/51, 52, 54; 317/18; 340/255

[56] References Cited

UNITED STATES PATENTS

| | | |
|---|---|---|
| 2,315,383 | 3/1943 | Andrews ............................. 324/52 |
| 2,315,450 | 3/1943 | Nyquist .............................. 324/52 |
| 2,627,540 | 2/1953 | Rich .................................. 324/51 |
| 2,832,916 | 4/1958 | Kennedy .......................... 324/51 X |
| 2,999,231 | 9/1961 | Kusters et al. .................. 324/51 X |
| 3,066,284 | 11/1962 | McKinley et al. .............. 324/51 X |

Primary Examiner—Gerard R. Strecker
Attorney—Smythe & Moore

[57] ABSTRACT

An electrical leakage detector indicating hazard level, for use in hospitals or the like, using a constant current generator having at least two side band frequencies on either side of the line frequency with a high impedance return to the ground from the constant current generator, together with a discriminator means to distinguish between the power line frequency and the two side band frequencies and for indicating departure of current from predetermined limits.

6 Claims, 4 Drawing Figures

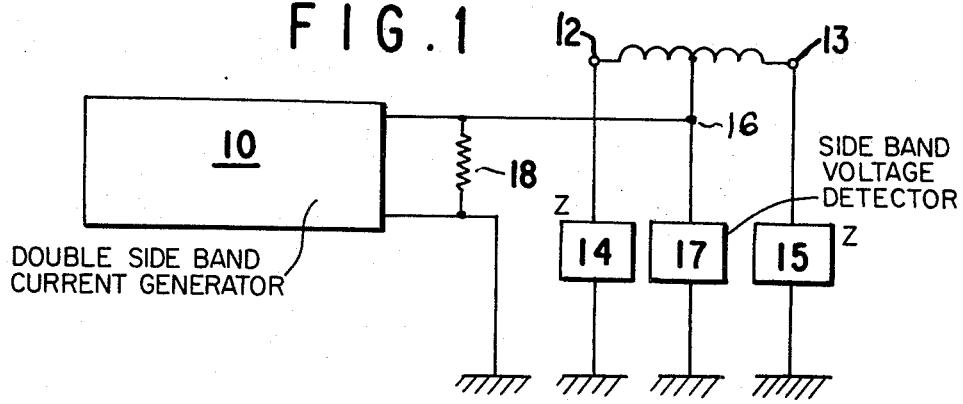
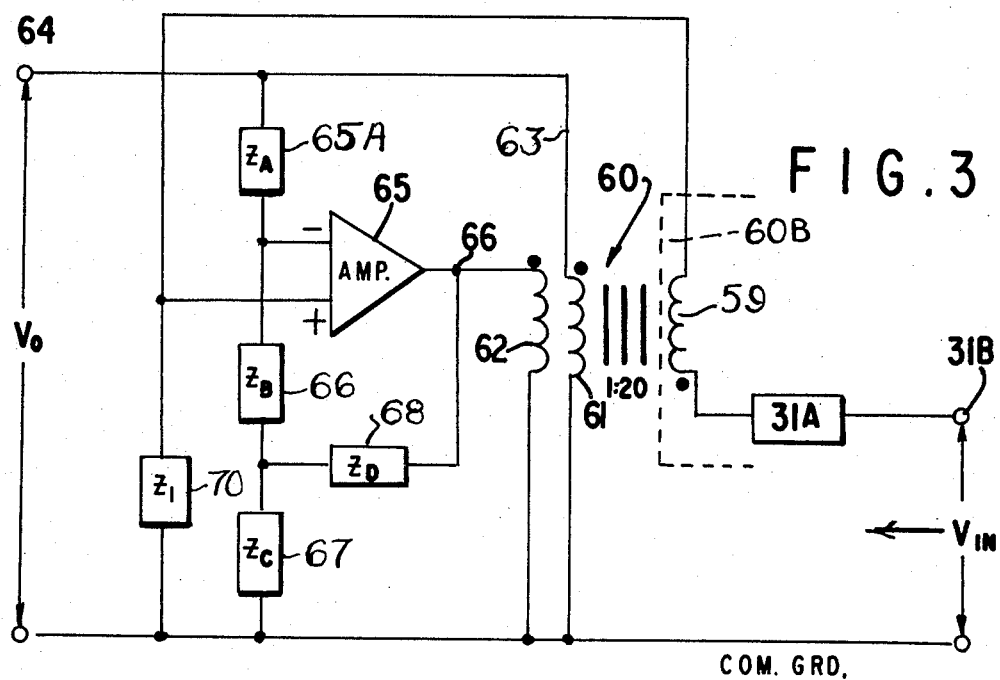
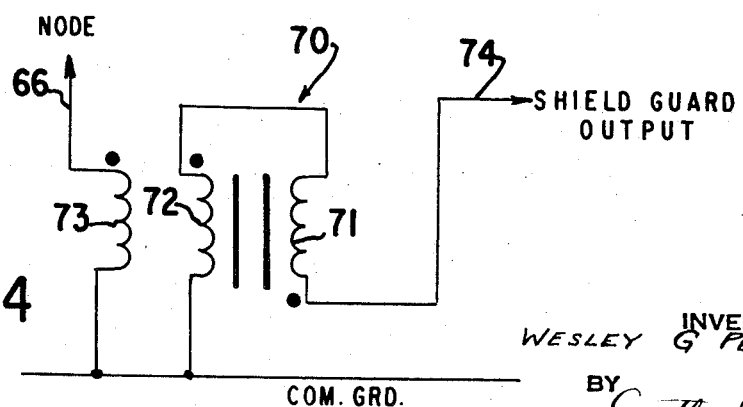

SENSITIVE SOUND FAULT METER AND DETECTOR UTILIZING A DOUBLE SIDE BAND FREQUENCY CURRENT-GENERATOR

This invention relates to hazard level indicators and particularly to a low leakage current or ground fault indicator or detector for use in hospital operating rooms or the like.

Previously, various systems have been used for determining leakage between an ungrounded system and the ground. Some of these systems use an arrangement for sequentially connecting each of the lines to ground and indicating or detecting the amount of current flowing through the circuit when it reaches high values. In areas, such as hospital operating rooms, where there is a danger of explosion from gases or shock, electrical codes provide for the use of isolated or ungrounded power lines, and these codes also require leakage current detectors. The current involved in some of the prior systems has been sufficiently high to possibly, in some instances, be hazardous.

One of the objects of the invention is to provide an improved ground fault or leakage indicator.

Another object of the invention is to provide a ground fault or hazard leakage indicator which does not provide a hazardous current level when there is a leakage condition.

In one aspect of the present invention, the leakage detector includes a constant current generator which has constant current output at two side band frequencies, one of which is on one side of the power line frequency and the other on the other side. The output of the constant current generator is connected to the lines being monitored. A high impedance return connection is provided from the constant current regulator to the ground so that the impedance is such that the detected current will be extremely small. A discriminator means is used to distinguish between the side band frequencies so as to give an indication if the leakage level reaches an undesirable high value.

One of the purposes is to continuously monitor the absolute value of the line frequency leakage path from the circuit to ground which might present a clinical hazard to patients.

Other objects, advantages and features of the invention will become apparent from the following description and drawings, which are merely exemplary.

In the drawings:

FIG. 1 is a schematic block diagram illustrating the principles of the invention;

FIG. 3 is a fragmentary schematic diagram illustrating one form of an attenuator that may be used; and FIG. 4 is a fragmentary schematic diagram showing a guard system that can be used.

Figure 2:
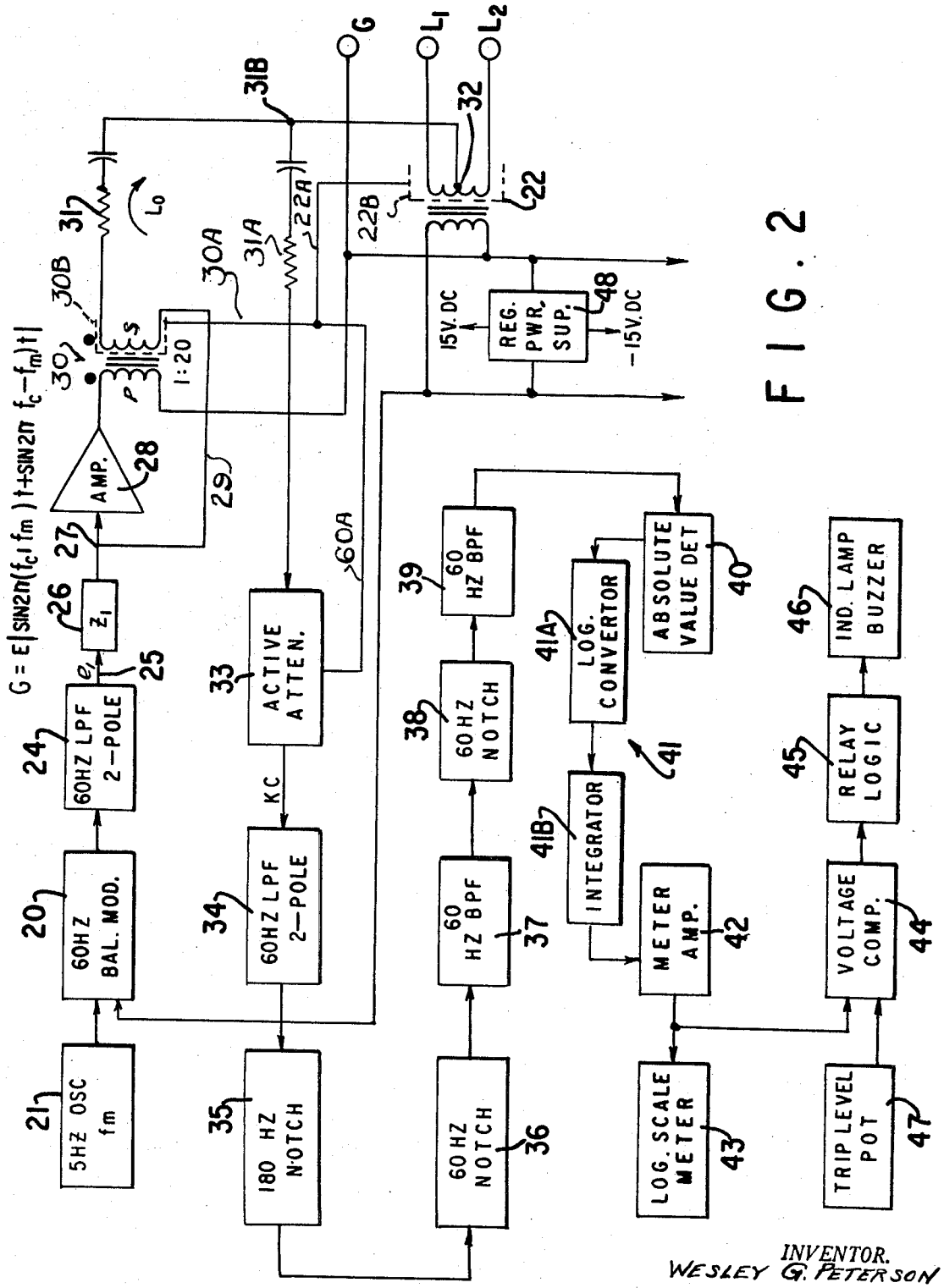
FIG. 2 is a block diagram showing one form of carrying out the invention.

Referring to the schematic illustration of FIG. 1, constant current generator 10 generates constant current at least at two frequencies which are on either side of the power line frequency, such being termed side band frequencies. For example, the frequencies can be 5 Hz above and 5 Hz below the power line frequency. Ungrounded power lines 12 and 13 are connected to the current generator through the common node 16. High source impedance 18 is indicated as being across the current generator and ground, the impedance being made as large as possible compared to the impedance indicated by the boxes 14 and 15. The voltage from node 16 to ground is measured by a suitable instrument 17. In case of a leakage occuring in either line 12 or 13, there will be an indication in 17 of the change in impedance.

It would be desirable to make the leakage impedance measurement at 60 Hz, but an active 60 Hz line itself introduces 60 Hz, which is difficult to separate from the desired signal. For this reason, the 60 Hz signal contributed by the line is carefully filtered out by an active filter. Additionally, all line frequency harmonics, especially the third at 180 Hz, are also filtered. In order to make the measurement, a pseudo 60 Hz signal is created which effectively mimics 60 Hz for measurement purposes but is not discriminated against by the filter chain. This new signal is composed of two equal amplitude signals placed in frequency above and below 60 Hz, i.e., 55 Hz and 65 Hz, and produced in the output of a balanced modulator as side bands by a 5 Hz oscillator modulating a 60 Hz carrier. A low-pass filter follows the modulator to remove spurious side bands about the odd harmonics of the carrier.

Referring now to FIG. 2, power lines $L_1$ and $L_2$ are the lines being monitored. As mentioned, the invention will be described as applied to a 60 Hz supply with the side band frequencies at ±5 Hz. It is to be understood that other frequencies and side bands can be used. The ground connection for the system is indicated at G. The various parts shown and described in the drawings comprise known electrical circuits except as may be described specifically hereafter. Oscillator 21, which is a 5 Hz oscillator, is used to create the side bands in conjunction with the line frequency introduced by lines $L_1$ and $L_2$ through the balanced modulator 20. In the particular example shown, the oscillator provides a double side band of 5 Hz on either side of the 60 Hz signal line frequency which is seen in an isolating transformer 22. In effect, the 60 Hz signal is a carrier with a modulation signal having a 5 Hz signal on either side so as to provide a 55 Hz and 65 Hz signal but not including the 60 Hz signal. Such can be termed a "double side band suppressed carrier." Low-pass filter 24 eliminates the higher order of side band signals harmonically related to the carrier frequency. The voltage at point 25 from low-pass filter 24 contains only the 55 Hz and 65 Hz frequencies.

The voltage at point 25 is fed through impedance 26 to the summing junction 27 of operational amplifier 28. The summing junction 27 is assumed to be at virtual ground potential so that all of the voltage 25 is across impedance 26 to cause a current to flow into the summing junction. Virtually all of the current at the summing junction 27 flows through line 29 to the secondary of transformer 30. From the secondary, it is fed through impedance 31, consisting of resistor and capacitor, to the common node or center tap 32 of transformer 22. Eventually, it is fed to the 60 Hz isolated lines. Operational amplifier 28 provides that the potential of the summing junction 27 is maintained at virtual ground. This is obtained by closing the loop around the operational amplifier through the transformer 30. Because the summing junction 27 is held stable by the loop, constant current is available at the output of the constant current generator at 31B irrespective of load.

Thus, it can be seen that the output $e_1$ of the side band generator drives operational amplifier 28. The output signal of amplifier 28 at the secondary of 30 is a current of magnitude $i_0 = e_1/Z_1$. Because of the current feedback loop around the amplifier, $i_0$ is nearly independent of the external loop.

As an example, the source impedance for the current generator can be in the order of 200 megohms. Thus, the current is impressed upon the two isolated lines $L_1$, $L_2$ from point 32. The voltage which appears between point 32 and ground is measured by a very high impedance volt meter, which also has an impedance of the order of 200 megohms, the volt meter consisting of high impedance attenuator 33, a series of filters including 60 Hz two-pole low-pass filter 34, 180 Hz notch filter 35, 60 Hz notch filter 36, 60 Hz band pass filter 37, 60 Hz notch filter 38, which is the same as notch filter 36, and a 60 Hz band filter 39, which is the same as band pass filter 37. The output of band pass filter 39 is then fed to a detector which converts the a.c. voltage signal to d.c., the detector being an absolute value detector 40. Filters 34, 35, 36, 37, 38 and 39 serve as a discriminator to distinguish between the side band frequencies and the line frequency. The output of the absolute value detector is fed to logarithm converter 41 and then to meter amplifier 42 and to a standard d.c. milliameter 43. The logarithm converter may consist of log converter 41A and integrator 41B. The milliamater 43 can be a two decade log scale which can measure, for example, from 30 microamps of leakage to 3,000 microamps.

Summarizing, the current introduced to the a.c. lines in common nodes by means of the primary center tap node 32 of transformer 22 must find a return path through whatever leakage impedance exists from either line to ground. The very high impedance attenuator is placed from the same point node 32 on the transformer to ground or in parallel with the leakage impedance to be measured. The output of the attenuator is a signal containing line frequency and double side band signal voltage wherein the side band voltage is proportional to the leakage impedance. After filtering to remove the unwanted signals, the desired signal is full wave detected in an absolute value detector. The detector and related parts convert the side band signal to a d.c. level with an a.c. ripple equal to the difference frequency of 10 Hz plus side band components. The log converter takes the logarithm of this signal, integrates out the higher order side bands and subtracts the d.c. component and 10 Hz from a constant voltage $k$. Such is equivalent to stating that if the smoothed d.c. voltage $E$ is proportional to the leakage impedance $Z$, $$E \sim Z$$

then $k - \log E \sim k - \log Z = \log K - \log Z = \log K/Z$ where $K$ is a new constant and the output of the log converter $V \sim \log K/Z$. If the new constant $K$ represents the nominal line voltage of, for example, 120 VAC, $V$ is a voltage which is proportional to the logarithm of the leakage current because this is defined to be equal to $K/Z$. In this manner, it is convenient to display two decades of leakage current with constant precision on a d.c. meter with a log scale. In the present example, the scale is calibrated 0.03 to 3.0 milliamperes.

Additionally, an alarm circuit can be provided. If a predetermined high leakage current is indicated, one type of indication will be provided, and if the leakage current is below a predetermined value, another type of indication will be given. Such can be accomplished by a voltage comparator 44 driving a solid state relay 45 which can operate a signal arrangement 46. The reference for the voltage comparator is set by the trip level pot 47.

FIG. 3 shows the circuitry of one form of active attenuator that can be used. Common node 31B is connected through the impedance 31A, which includes a resistor and capacitor (FIG. 2), to the secondary 59 of a 1 to 20 turns ratio transformer 60. The transformer has bifilar wound primaries 61, 62. One side of primary 61 is connected to ground, and the opposite side is connected through line 63 to point 64 (FIGS. 2, 3) so as to appear as the attenuator output, which in turn is connected to low-pass filter 34. Primary 62 also is connected to ground, and the other side is driven by the output of amplifier 65 which is similar to operational amplifier 28 (FIG. 2). The configuration of the attenuator may be said to be identical to the configuration of the current generator described previously, which includes impedance 26, amplifier 28, transformer 30 and feedback 29, with the exception that the input point of the current generator 26 is referred to ground rather than driven by some voltage. This provides the same type of active source impedance as would be found from the current generator, e.g., 200 megohms, and also provides the 20 to 1 attenuation factor of the input signal by the attenuator to output 64. The various impedances 65A, 66, 67 and 68 are used for stabilization purposes of the attenuator. Impedance 70 is analogous to impedance 26 of FIG. 2.

A guard system can be used in conjunction with the 20 to 1 active attenuator to cancel the effect of interwinding capacitance and winding to core capacitance, of each of the transformers in the circuit, e.g., transformers 22, 30 and 60. These connections and elements are shown schematically as 22A and 22B, 30A and 30B, and 60A and 60B. Since each transformer in the circuit otherwise would introduce leakage of its own which would be analogous to external leakage and would be indistinguishable, each transformer can thus be guarded and effectively nullify this capacitance.

One form by which the guard effect can be accomplished is seen in FIG. 4 by introducing a third transformer 70 identical to transformer 60 (FIG. 3) in such a manner that the primary 73 is in parallel with the primary 62 of transformer 60 at point 66. In so doing, the attenuated signal is boosted back in autotransformer fashion so as to have an output signal from secondary 71 of transformer 70 which is almost precisely the same as the voltage being measured so that it is a source that can be used to drive the guard or electrostatic shields of the transformers as mentioned.

The potential leakage hazard measurement may be made therefore in a manner which itself introduces a maximum measurement leakage current which may be, for instance, less than one-sixth of the least potential current to be measured.

The guard output also could be used to guard the system power wires as well by connecting the voltage to the shields of the power wires.

I claim:

1. In a leakage detector for a power system having two isolated conductors to be monitored, said power system having a predetermined frequency, the combination including a constant current generator having an output of at least two side band frequencies, one above and one below said predetermined frequency, means connecting one side of the output of said current generator to earth ground, means for feeding the other side of the output of said current generator through a transformer means to said two conductors, discriminator means, means connecting said transformer means to said discriminator means, said discriminator means distinguishing between said side band frequencies and the frequency of the line being monitored, and means connected to said discriminator means to indicate the impedance of the power system to earth ground.

2. In a leakage detector as claimed in claim 1 and including means to indicate when the impedance to earth ground is more os less than a predetermined value.

3. In a leakage detector as claimed in claim 1 and wherein the constant current generator includes an operational amplifier in a closed loop.

4. In a leakage detector as claimed in claim 3 wherein the constant current generator is driven by double side band signal means.

5. In a leakage detector as claimed in claim 1 wherein the discriminator means includes filter means to distinguish between the side band frequencies and said predetermined frequency.

6. In a leakage detector as claimed in claim 1 and including means for providing guard voltage means to drive guard shields between circuit means connected to said isolated conductors and other components of said leakage detector.

* * * * *